United States Patent
Ito (10) Patent No.: US 7,173,235 B2
(45) Date of Patent: Feb. 6, 2007

(54) APPARATUS FOR OPTICALLY READING TARGET

(75) Inventor: Kunihiko Ito, Chiryu (JP)

(73) Assignee: Denso Wave Incorporated, Tokyo (JP)

( * ) Notice: Subject to any disclaimer, the term of this patent is extended or adjusted under 35 U.S.C. 154(b) by 110 days.

(21) Appl. No.: 10/963,749

(22) Filed: Oct. 14, 2004

(65) Prior Publication Data
US 2005/0098746 A1      May 12, 2005

(30) Foreign Application Priority Data
Oct. 16, 2003  (JP)  ............ 2003-356275

(51) Int. Cl.
*G02B 6/00* (2006.01)

(52) U.S. Cl. .............. 250/227.2; 250/227.11; 250/227.24; 250/227.29; 250/566; 235/454; 235/462.41; 385/146

(58) Field of Classification Search ........ 250/566, 250/568, 227.11, 227.2, 227.24, 227.26, 227.28, 250/227.29; 235/454, 462.14, 472.01, 462.41; 385/36, 88, 89, 92, 94, 14, 146
See application file for complete search history.

(56) References Cited

U.S. PATENT DOCUMENTS

| | | | | |
|---|---|---|---|---|
| 5,099,131 A | * | 3/1992 | Brownrigg et al. | 250/458.1 |
| 5,449,892 A | * | 9/1995 | Yamada | 235/462.42 |
| 5,586,212 A | * | 12/1996 | McConica et al. | 385/146 |
| 5,808,286 A | * | 9/1998 | Nukui et al. | 235/472.01 |
| 5,925,867 A | * | 7/1999 | Hagimoto | 235/454 |
| 5,992,749 A | * | 11/1999 | Seo | 235/472.01 |
| 6,081,630 A | * | 6/2000 | Kaneko | 382/313 |
| 6,182,892 B1 | * | 2/2001 | Angelo et al. | 235/380 |
| 6,244,509 B1 | * | 6/2001 | Klevtsov | 235/454 |
| 6,796,502 B2 | * | 9/2004 | Nogami et al. | 235/454 |
| 6,854,650 B2 | * | 2/2005 | Hattersley et al. | 235/454 |
| 6,860,424 B1 | * | 3/2005 | Philyaw et al. | 235/462.32 |
| 6,932,271 B2 | * | 8/2005 | Nakajima et al. | 235/454 |
| 2001/0005004 A1 | * | 6/2001 | Shiratsuki et al. | 250/566 |

FOREIGN PATENT DOCUMENTS

| | | | |
|---|---|---|---|
| JP | 2000-298698 | | 10/2000 |
| JP | 2003331213 A | * | 11/2003 |

* cited by examiner

*Primary Examiner*—Stephone B. Allen
*Assistant Examiner*—Davienne Monbleau
(74) *Attorney, Agent, or Firm*—Posz Law Group, PLC (57) ABSTRACT

In an apparatus for optically reading a target based on a light reflected from the target, a light source has a first optical axis and operates to emit light. An imaging optical system has a second optical axis. The imaging optical system is arranged so that the reflected light enters into the imaging optical system. A photodetector has an active area so that the imaging optical system focuses the reflected light on the active area of the photodetector. A light guide member is arranged between the target and the imaging optical system on the first and second optical axes, respectively. The light guide member is configured to guide the light emitted from the light source while preventing the guided light from leaking therefrom to irradiate the guided light to the target.

12 Claims, 6 Drawing Sheets

APPARATUS FOR OPTICALLY READING TARGET

CROSS REFERENCE TO RELATED APPLICATION

This application is based on Japanese Patent Application 2003-356275 filed on Oct. 16, 2003 and claims the benefit of priority therefrom, so that the descriptions of which are all incorporated herein by reference.

BACKGROUND OF THE INVENTION

1. Field of the Invention

The present invention relates to an apparatus for optically reading a target including an information code.

2. Description of the Related Art

A conventional optical information reader aims at reading a target including information that is optically readable, such as a barcode, a two-dimensional code, or other similar codes.

Figure 8:
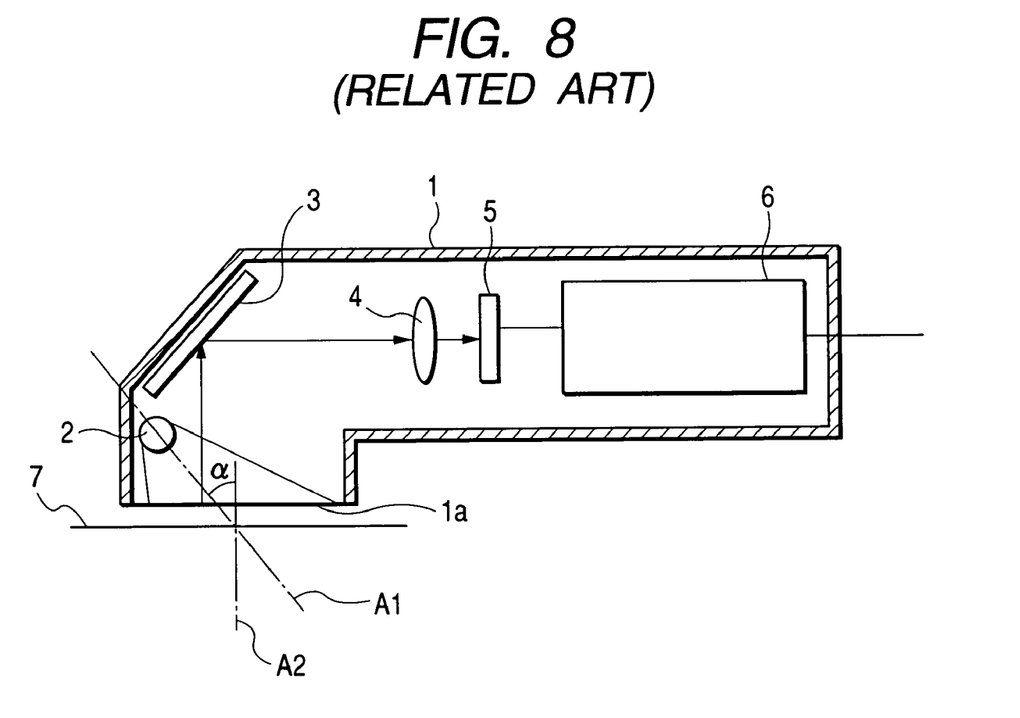
FIG. 8 is a view schematically illustrating a basic configuration of a handheld two-dimensional code scanner as an example of a conventional optical information reader.

FIG. 8 is a view schematically illustrating a basic configuration of a handheld two-dimensional code scanner as an example of a conventional optical information reader.

In the two-dimensional code scanner shown in FIG. 8, a user's handheld case 1 has at its one end portion with a rectangular reading window 1a. In the case 1, a lighting unit 2 composed of a plurality of light emitting devices (LED) is installed for emitting light through the reading window 1a toward an outside of the case 1. In the case 1, a reflector 3, an imaging lens 4, and a photodetector 5, such as a CCD area sensor, are installed, respectively. The two-dimensional code scanner is also provided with a processing circuit 6 in the case 1 for decoding a signal corresponding to a reflected light from the target and transmitted from the photodetector 5.

In order to optically read a two-dimensional code, such as a QR code written on a surface of a target 7, with the use of the scanner, a user brings the scanner toward the target 7 so that the scanner's reading window 1a is close to the target 7 in substantially parallel to the surface of the target 7. The user gives instructions for executing reading operations to the scanner so that light is emitted from the lighting unit 2 and the emitted light is irradiated through the reading window 1a to the target 7.

Light reflected from the target 7 is entered through the reading window 1a into the reflector 3 to be reflected toward the imaging lens 4. The reflected light enters into the imaging lens 4 and the entered light is focused on the active area (light sensitive pixel area) of the photodetector 5 by the imaging lens 4, so that an image corresponding to the target 7 is picked up by the photodetector 5. The image picked up by the photodetector 5 is sent to the processing circuit 6 so that the two-dimensional code of the label P is decoded by the processing circuit 6 based on the image. The conventional imaging lens 4 is composed of a minification optical system having a feature such that the more away an area that the lens 4 can view is from the lens 4, the wider an angle of view (a field of view) is.

Such a conventional optical information reader (referred to as information reader) is in common use for optically reading, as the target 7, a label, which is a piece of paper or another media, on which an information code is written. Recently, however, new usage that the conventional information reader optically reads an information code displayed on the screen of a liquid crystal display (LCD) in a computer terminal, such as a cellular phone or a PDA (Personal Digital Assistant), has been considered. In addition, users want to use such a conventional information reader for optically reading an information code directly printed on metal in direct marking.

When optically reading, as the target, the information code displayed on the screen of an LCD with the use of the conventional information reader, because the liquid crystal layer of an LCD has a very low transmittance to light, for example the order of a few percents, the emitted light is difficult to enter through the liquid crystal layer. The light reflected from the information code is also difficult to be transmitted through the liquid crystal layer. These reasons cause the amount of the reflected light that returns to the information code reader to decrease.

In particular, as shown in FIG. 8, if the optical axis A1 of the lighting unit 2 is inclined at an angle α with respect to a normal line A2 of the liquid crystal layer, it would be difficult to accurately read the information code displayed on the screen of an LCD.

Based on the background, a reading apparatus is designed so that the optical axis of a surface light source as a lighting unit is arranged to be orthogonal to the optical axis of a minification lens system and that of a photodetector. The reading apparatus is also designed to have a half mirror disposed between the lens system and the surface light source so that the optical axis of the half mirror is crossed at an angle of 45 degrees with respect to the optical axis of the lens system and that of the surface light source, respectively. The configuration of the reading apparatus is disclosed in Japanese Unexamined Patent Publication No. 2000-298698.

In the configuration of the disclosed reading apparatus, light emitted from the surface light source is reflected by the half mirror, and the reflected light is transmitted coaxially with the lens system toward a target. Light reflected from the target is transmitted through the half mirror to enter into the lens system, and the entered light is focused on the active area of the photodetector.

The configuration of the reading apparatus disclosed in the publication is provided with the minification lens system having a feature such that the more away an area that the lens system can view is from the lens system, the wider an angle of view is. The minification lens system of the reading apparatus disclosed in the publication can accurately read the information code displayed on the screen of an LCD if the screen-displayed information code is disposed close to the reading window of the reading apparatus.

If, however, the reading window of the reading apparatus is located away from the screen-displayed information code, the more away the screen-displayed information code is from the reading window, the smaller a magnification of the information code is. This may cause the number of pixels in the active area that are allocated to the image focused thereon to decrease. As a result, the disclosed reading apparatus may be difficult to read the screen-displayed information code if the reading window of the reading apparatus is located away from the screen-displayed information code.

In addition, in the configuration of the reading apparatus disclosed in the publication having the half mirror, the light emitted from the surface light source is diffused before the emitted light is irradiated to the target, causing light loss to increase. In particular, the quantity of light irradiated to the target may decrease to 30 percent of that of light emitted from the surface light source. This increase of the light loss may cause shortage of the quantity of light irradiated to the target.

SUMMARY OF THE INVENTION

The present invention is made on the background so that preferable embodiments of optical reading apparatuses of the present invention each are designed to accurately read a target even if the target, for example, is displayed on the screen of an LCD.

According to one aspect of the present invention, there is provided an apparatus for optically reading a target based on light reflected from the target. The apparatus comprises a light source having a first optical axis and configured to emit light, and an imaging optical system having a second optical axis and arranged so that the reflected light enters into the imaging optical system. The apparatus comprises a photodetector having an active area. The imaging optical system focuses the reflected light on the active area of the photodetector. The apparatus comprises a light guide member arranged between the target and the imaging optical system on the first and second optical axes, respectively. The light guide member is configured to guide the light emitted from the light source while preventing the guided light from leaking therefrom to irradiate the guided light to the target.

According to another aspect of the present invention, there is provided an apparatus for optically reading a target based on light reflected from the target. The apparatus comprises a light source having a first optical axis and configured to emit light, and an imaging optical system having a second optical axis and arranged so that the reflected light enters into the imaging optical system. The apparatus comprises a photodetector having an active area, said imaging optical system focusing the reflected light on the active area of the photodetector, and a light guide member arranged between the target and the imaging optical system on the first and second optical axes, respectively. The light guide member has an entrance plane into which the light emitted from the light source enters and an output plane arranged on the second optical axis and in opposite to the target. The light guide member has a half mirror plane arranged in opposite to the entrance plane and the output plane on the first and second optical axes, and other planes parallel to either the first optical axis or the second optical axis. The half mirror plane is configured to reflect the light entered through the entrance plane into the light guide member toward the output plane. The reflected light enters from the output plane to be transmitted through the half mirror plane along the second optical axis to enter into the imaging optical system. The other planes are configured to reflect the emitted light from the light source and the reflected light incident thereto toward an inside of the light guide member. The half mirror plane is inclined with respect to the first optical axis at an angle of $\theta 1$. The output plane is inclined with respect to a direction orthogonal to the second optical axis at an angle of $\theta 2$ so that a refractive angle of light refracted by the output plane is increased. When a refractive index of the light guide member is represented as n, the inclined angle $\theta 2$ is set to meet the following equation:

$$n \cdot \sin(\theta 1 + \theta 2 - \alpha) = \sin \theta 2$$

where $\alpha$ is represented by the following equation:

$$\alpha = \sin^{-1}\left(\frac{\sin\theta 1}{n}\right)$$

According to a further aspect of the present invention, there is provided an apparatus for optically reading a target based on light reflected from the target. The apparatus comprises a light source having a first optical axis and configured to emit light, an imaging optical system having a second optical axis and arranged so that the reflected light enters into the imaging optical system, and a photodetector having an active area. The imaging optical system focuses the reflected light on the active area of the photodetector. The apparatus also has a light guide member arranged between the target and the imaging optical system on the first and second optical axes, respectively. The light guide member has an entrance plane into which the light emitted from the light source enters and an output plane arranged on the second optical axis and in opposite to the target. The light guide member has a half mirror plane arranged in opposite to the entrance plane and the output plane on the first and second optical axes, and other planes parallel to either the first optical axis or the second optical axis. The half mirror plane is configured to reflect the light entered through the entrance plane into the light guide member toward the output plane. The reflected light enters from the output plane to be transmitted through the half mirror plane along the second optical axis to enter into the imaging optical system. The other planes are configured to reflect the emitted light from the light source and the reflected light incident thereto toward an inside of the light guide member. The half mirror plane is inclined with respect to the first optical axis at an angle of $\theta 1$. The output plane is inclined with respect to a direction orthogonal to the second optical axis at an angle of $\theta 2$ so that a refractive angle of light refracted by the output plane is decreased. When a refractive index of the light guide member is represented as n, the inclined angle $\theta 2$ is set to meet the following equation:

$$n \cdot \sin(\theta 1 - \theta 2 - \alpha) = \sin \theta 2$$

where $\alpha$ is represented by the following equation:

$$\alpha = \sin^{-1}\left(\frac{\sin\theta 1}{n}\right)$$

BRIEF DESCRIPTION OF THE DRAWINGS

Other objects and aspects of the invention will become apparent from the following description of embodiments with reference to the accompanying drawings in which.

DETAILED DESCRIPTION OF AN EMBODIMENT OF THE INVENTION

Figure 1:
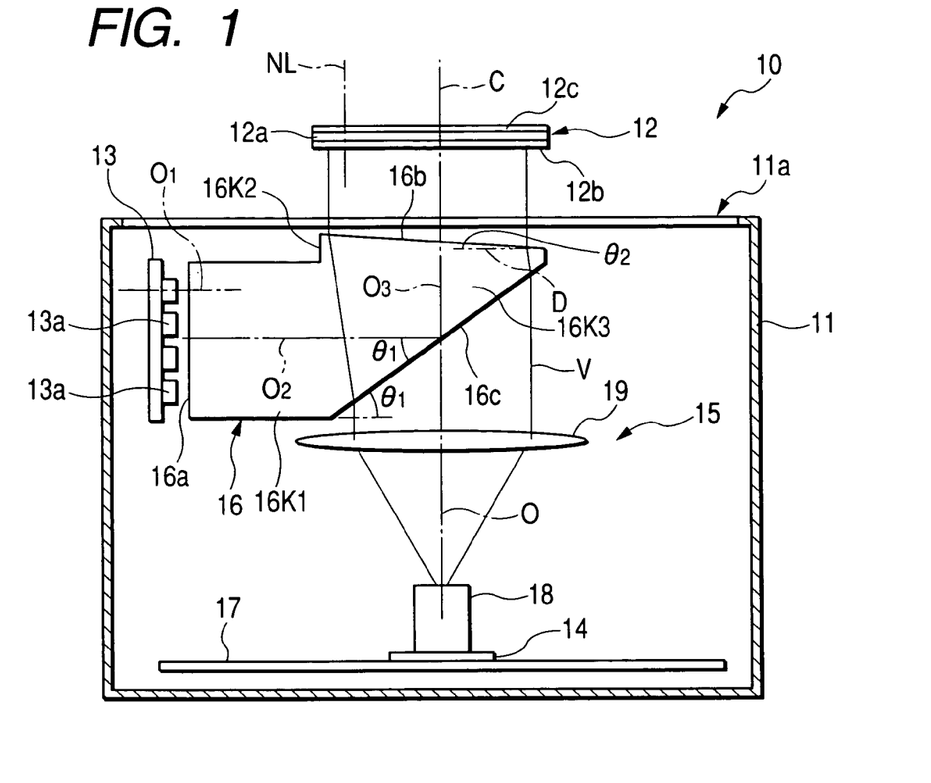
FIG. 1 is a partially cross sectional view schematically illustrating a main part of an apparatus for optically reading a target according to an embodiment of the present invention.

An embodiment of the present invention will be described hereinafter with reference to the accompanying drawings. In the embodiment, the invention is applied to a stationary apparatus 10 for optically reading a target. FIG. 1 is a view schematically illustrating a main part of the apparatus 10 according to the embodiment of the present invention.

The reading apparatus 10 is provided with a body case 11 having, for example, a rectangular parallelepiped shape. The body case 11 is formed at one end wall with a reading window 11a having translucency. When a target 12 having a two-dimensional surface is arranged close to the reading window 11a of the body case 11 and the two-dimensional surface of the target 12 is parallel to the reading window 11a, the reading apparatus 10 operates to read an information code written on the two-dimensional surface.

In the embodiment, the target 12 is, for example, a screen of an LCD, and the reading apparatus 10 aims at reading a two-dimensional code as an information code, such as QR code, displayed on the screen 12. The LCD is installed in, for example, a computer terminal, such as a cellular phone or a PDA (Personal Digital Assistant).

As schematically illustrated in FIG. 1, the screen 12 of the LCD is provided with a liquid crystal layer 12a in which the two dimensional code is displayed and a translucent protection layer 12b made of plastic or glass and mounted on one end surface of the liquid crystal layer 12a. The screen 12 of the LCD is also provided with a reflection portion 12c mounted on the other end surface of the liquid crystal layer 12a.

That is, when the screen (target) 12 is arranged close to the reading window 11a of the body case 11 and the normal line NL of the liquid crystal layer 12a of the screen 12 is parallel to a center axis C of the reading window 11a, the reading apparatus 10 operates to read the information code displayed in the liquid crystal layer 12a of the screen 12.

The reading apparatus 10 is provided with a light source 13 serving as a source of light irradiated to the target 12. The reading apparatus 10 is provided with a photodetector 14 having an active area (light sensitive pixel area) and a predetermined optical axis O. The reading apparatus 10 is provided with a circuit board 17 disposed at a side of another end wall of the body case 11 opposite to the one end wall thereof and coaxially arranged with respect to the reading window 11a in parallel thereto.

The photodetector 14 is composed of, for example, a CCD area sensor. The photodetector 14 is mounted on the center portion of the circuit board 17 so that the active area is opposite to the reading window 11a of the body case 1 and that the optical axis O of the photodetector 14 is coaxially aligned to the center axis C of the reading window 11a.

The optical information apparatus 10 is provided with an imaging optical system 15 coaxially arranged with respect to the photodetector 2 and operative to focus an image of the target 12 on the active area of the photodetector 14.

The reading apparatus 10 has a light guide member 16 disposed among the reading window 11a, the light source 13, and the imaging optical system 15. The configuration of the light guide member 16 is described in detail hereinafter.

The light source 13 is composed of a plurality of light emitting devices (LEDs) 13a. Each of the light emitting devices 13a is disposed at a side of another one-end wall of the body case 1, which is adjacent to the reading window 11a thereof. Each of the light emitting devices 13a is arranged so that its light emitting surface is directed toward the center axis C of the reading window 11a and its optical axis O1 is orthogonal to the center axis C of the reading window 11a and the optical axis O of the imaging lens system 15 (photodetector 14).

The circuit board 17 is integrated with a control circuit composed of a microcomputer and electrically connected to the photodetector 14 and the like. The control circuit is operative to control the whole of the reading apparatus 10 and to perform decoding processes based on an image picked up by the photodetector 14.

Figure 3:
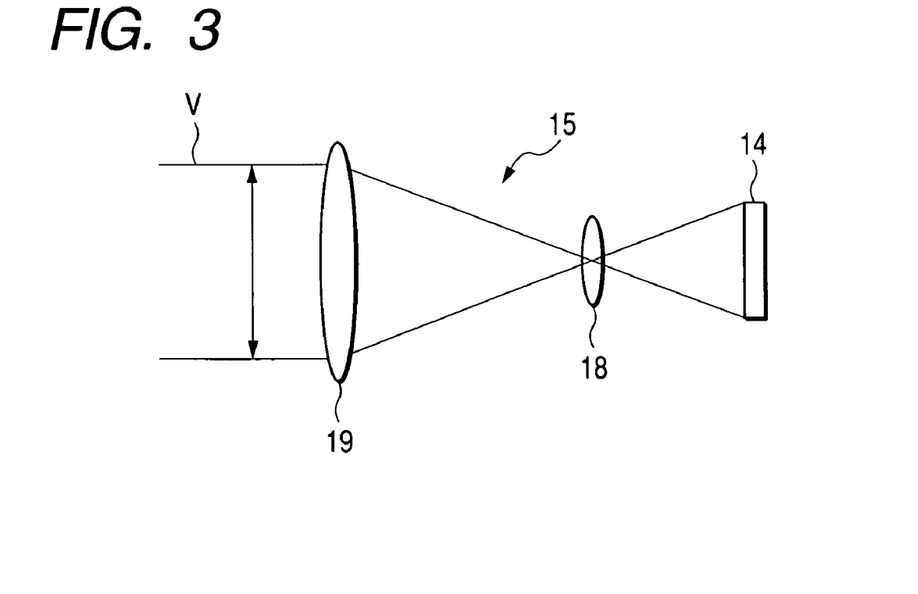
FIG. 3 is a view schematically illustrating a configuration of an imaging optical system shown in FIG. 1.

As shown in FIG. 3, the imaging optical system 15 preferably has a first optical system 18 coaxially arranged with respect to the photodetector 14 to be close to the active area of the photodetector 14. The imaging optical system 15 preferably has a second optical system 19 coaxially arranged between the first optical system 18 and the reading window 11a. The first optical system 18 is composed of a body tube and one or more lens elements disposed coaxially therein to provide the optical axis O. The second optical system 19 is composed of a convex lens (simple lens) made of, for example, synthetic resin.

The imaging optical system 15 composed of the first and second optical systems 18 and 19 has a field of view V defined by the first and second optical systems 18 and 19. The outer periphery of the field of view V is illustrated by thin lines in FIGS. 1 and 3. As shown in FIGS. 1 and 3, the imaging optical system 15 employs a telecentric optical system.

That is, the first optical system 18 is operative to focus an image of the target 12 on the active area of the photodetector 14. The second optical system 19 is operative to focus light on the first optical system 18 for preventing the field of view V of the first optical system 18 from substantially spreading. In other words, the second optical system 19 allows the angle of view of the first optical system 18 to become substantially zero. The first and second optical systems 18 and 19 are designed as being integrally used since the beginning.

Next, the configuration of the light guide member 16 will be explained in accordance with FIGS. 1 and 2.

The light guide member 16 is arranged on the optical axes O and O1. The light guide member 16 is, for example, integrally machined transparent plastic material, such as acrylic material or polycarbonate resin material to have a substantially L shape in its cross section parallel to the optical axes O and O1.

That is, the light guide member 16 is composed of a first light guide portion 16K1. The first light guide portion 16K1 has, for example, a substantially tubular shape with, for example, a substantially square in its cross section orthogonal to its axial direction, and has an optical axis O2 parallel to the optical axis O1 of each of the light emitting devices 13a. The first light guide portion 16K1 is operative to guide light emitted from each light emitting device 13a.

The light guide member 16 is composed of a second light guide portion 16K2. The second light guide portion 16K2 has a substantially tubular shape with, for example, a substantially square in its cross section orthogonal to its axial direction, and has an optical axis O3 crossed at 90 degrees to the optical axis O2 of the first light guide portion 16K1. The second light guide portion 16K2 is coaxially aligned to the optical axis O of the imaging optical system 15.

The light guide member 16 is composed of a coupling portion 16K3 coupling between the first and second light guide portions 16K1 and 16K2. The coupling portion 16K3 has an inclined plane 16c arranged on the optical axes O2 and O3 of the first and second light guide portions 16K1 and 16K2 so that a surface direction of the inclined plane 16c is inclined at an angle of θ1 with respect to the optical axis O2 of the first light guide portion 16K1.

The first light guide portion 16K1 includes one end outer plane 16a orthogonal to the optical axis O2 and opposite to the inclined plane 16c. The one end outer plane 16a of the first guide portion 16K1 serves as an entrance plane that has an area allowing the light emitted from each light emitting device 13a to enter. The entrance plane 16a extends orthogonally to the optical axis O2 of the first guide portion 16K1. The entrance plane 16a preferably serves as a diffusing surface formed wholly with thin concavities and convexities.

The second light guide portion 16K2 has one end outer plane 16b that is flat and opposite to the inclined plane 16c and serving as an output plane. The output plane 16b of the second light guide portion 16K2 is inclined at an angle of θ2 with respect to a surface direction D orthogonal to the optical axis O3 (the optical axis O of the imaging optical system 15). A coating of aluminum is evaporated over the inclined plane 16c so that the inclined plane 16c serves as a half mirror plane 16c.

Outer planes of the light guide member 16 except for the planes 16a to 16c are parallel to either the optical axis O2 or the optical axis O3. All of the outer planes of the light guide member 16 parallel to either the optical axis O2 or the optical axis O3 serve as reflection planes RP. The reflection planes RP are designed to reflect light, which is transmitted inside of the light guide member 16 and is incident to the outer planes RP, toward the inside of the light guide member 16. For example, a coating of aluminum is evaporated over each of the outer planes of the light guide member 16 parallel to either the optical axis O2 or the optical axis O3 to form each of the reflection planes RP with a suitable thickness.

The light guide member 16, as shown in FIG. 1, is arranged so that the entrance plane 16a is opposite to each light emitting device 13a with a small clearance therebetween, and that the output plane 16b is closely opposite to the reading window 11a with a small clearance therebetween. This arrangement of the light guide member 16 allows the whole of the field of view V of the imaging optical system 15 to be completely projected onto the half mirror plane 16c of the light guide member 16.

That is, the reading apparatus 10 is designed so that light emitted from the light source 13 enters from the entrance plane 16a into the light guide member 16 to be reflected by the half mirror plane 16c, thereby being outputted through the output plane 16b toward the target (screen) 12. The reading apparatus 10 is also designed so that light reflected from the target 12 enters from the output plane 16b into the light guide member 16 to be transmitted through the half mirror plane 16c, thereby entering into the imaging optical system 15.

In the embodiment, as set forth above, the output plane 16b of the light guide member 16 is inclined at the angle of θ2 with respect to the surface direction D orthogonal to the optical axis O of the imaging optical system 15 so that a refractive angle θx of light refracted by the output plane 16b is increased. In addition, the half mirror 16c of the light guide member 16 is inclined at the angle of θ1 with respect to the optical axis O2 of the light guide member 16. The angle of θ1 is preferably set to 45 degrees or thereabout.

In the embodiment, the angle θ2 of inclination is set to meet the following equation (1):

$$n \cdot \sin(\theta 1 + \theta 2 - \alpha) = \sin \theta 2 \quad (1)$$

where n indicates a refractive index of the light guide member 16, α is represented by the following equation (2):

$$\alpha = \sin^{-1}\left(\frac{\sin \theta 1}{n}\right) \quad (2)$$

The inventor of this application has derived the equation (1) based on Snell's law for providing the operations of the reading apparatus 10 described hereinafter.

In the embodiment, the refractive index n of the light guide member 16 is set to substantially 1.5 depending on the material of the light guide member 16, such as acrylic material or polycarbonate resin material.

Next, the operations of the reading apparatus 10 will be described hereinafter.

A user wants to read a two-dimensional code displayed on the screen (target) 12 of the LCD installed in a computer terminal, such as a cellular phone, with the use of the reading apparatus 10. In this case, the user brings the computer terminal toward the reading apparatus 10 so that the liquid crystal layer 12a of the target 12 is parallely close to the reading window 11a of the reading apparatus 10.

In other words, the target 12 is close to the reading window 11a of the reading apparatus 10 so that the normal line NL of the target 12 is substantially parallel to the center axis C of the reading window 11a of the reading apparatus 10.

After the arrangement, the control circuit operates to turn each light emitting device 13a of the light source 13 on. The turning-on operation of the control circuit is started in response to instructions given by the user. In a case where the control circuit operates to automatically turn each light emitting device 13a on, a detecting unit capable of detecting an object close to the reading window 11a may be previously disposed around the reading window 11a. That is, the control circuit starts to turn each light emitting device 13a on in response to detection of the target 12 close to the reading window 13a.

The light emitted from the light source 13 enters from the entrance plane 16a into the light guide member 16, and the entered light is transmitted toward the half mirror plane 16c. The light transmitted through the light guide member 16 is reflected by the half mirror plane 16c at an angle of 90 degrees to be directed toward the output plane 16b. The reflected light is transmitted in the optical guide member 16 along the optical axis O3 toward the output plane 16b to be outputted therefrom.

The outputted light is transmitted through the reading window 11a of the body case 11 to be irradiated to the target (screen) 12. Light reflected from the target 12 based on the irradiated light thereto enters through the reading window 11a and the output plane 16b into the light guide member 16. The light is transmitted through the half mirror plane 16c toward the imaging optical system 15 along the optical axis O to enter into the imaging optical system 15.

Because the light guide member 16 has the refractive index n, when the light is outputted from the output plane 16b to the outside thereof, the light is refracted based on the refractive index n. Similarly, when the light enters from the output plane 16b into the light guide member 16 and the reflected light is transmitted through the half mirror plane 16c, they are refracted based on the refractive index n, respectively.

Figure 4:
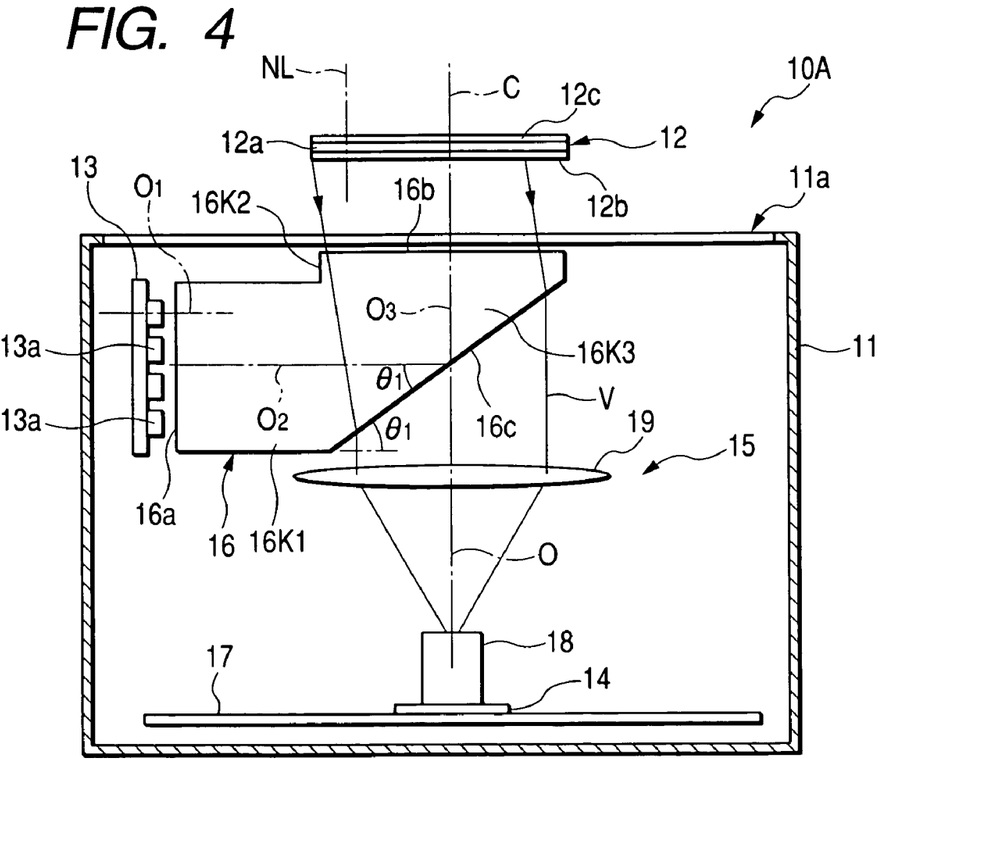
FIG. 4 is a view schematically illustrating a main part of an apparatus for optically reading a target if no inclined angle of an output plane of a light guide member of the apparatus is formed for comparison.

It is assumed that the output plane 16b is parallel to the surface direction D, in other words, orthogonal to the optical axis O3 (optical axis O) so that the angle of inclination of the output plane 16b is zero (see reading apparatus 10A in FIG. 4). In this assumption, the light reflected from the target based on the irradiated light enters into the light guide member 16 while being inclined with respect to the optical axis O3 (optical axis O). The reflected light entered into the light guide member 16 while being inclined with respect to the optical axis O3 is refracted based on the refractive index n, which may cause some of the reflected light to be deviated from the field of view V. This may result in that some of the reflected light is not focused on the active area of the photodetector 14.

In contrast, as shown in FIGS. 1 and 4, the light guide member 16 has the half mirror plane 16c inclined with respect to the optical axis O2 at the angle θ1 and the output plane 16b inclined with respect to the surface direction D orthogonal to the optical axis O3 at the angle of θ2 that satisfies the equation (1). The configuration of the light guide member 16, therefore, allows the light outputted from the output plane 16b to be irradiated substantially orthogonally to the target 12 (liquid crystal layer 12a), in other words, substantially parallely to the normal line NL. As a result, even if the liquid crystal layer 12a of the screen 12 has a low translucency, it is possible to pickup an image based on the reflected light without leaking some of the reflected light.

Figure 5:
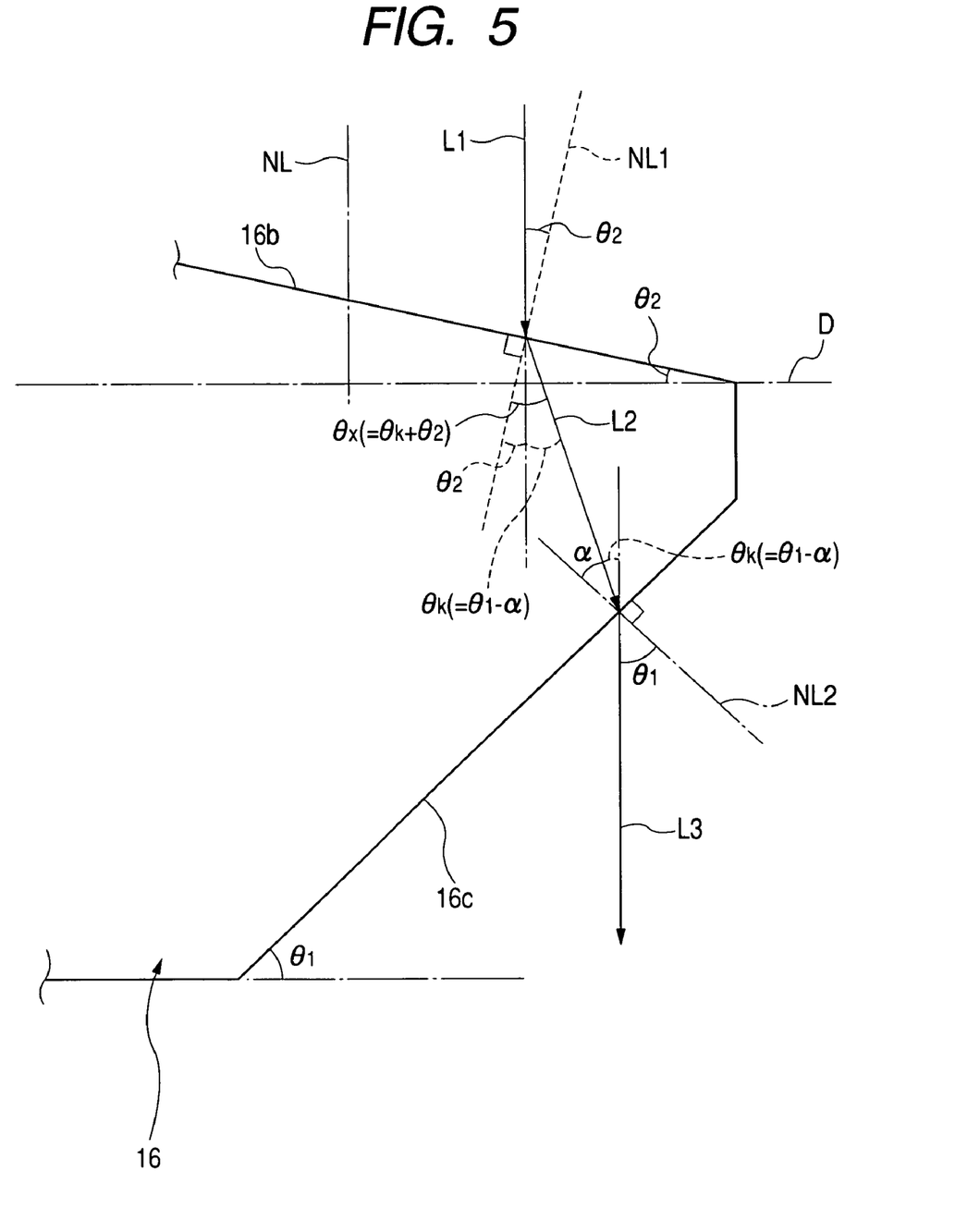
FIG. 5 is a view schematically illustrating a relationship between an inclined angle $\theta 1$ of a half mirror plane of the light guide member and an inclined angle $\theta 2$ of an output plane thereof according to the embodiment of the present invention.

In particular, as shown in FIG. 5, light L1 reflected from the target 12 along the normal line NL (the center axis CX of the reading window 11a) is incident from the outer plane 16b into the light guide member 16. The reflected light L1 is refracted at the refractive angle θx with respect to a normal line NL1 of the output plane 16b as light L2. The refracted light L2 is transmitted to enter into the half mirror plane 16c. The light L2 is refracted at a refractive angle θ1 with respect to a normal line NL2 of the half mirror plane 16c as light L3.

Setting the direction of the refracted light L3 parallel to the optical axis O requires setting the refractive angle to the angle of θ1, which leads to the establishment of the following equations based on Snell's law:

$$n \cdot \sin\alpha = \sin\theta1 \quad (2)$$

$$\alpha = \sin^{-1}\left(\frac{\sin\theta1}{n}\right) \quad (3)$$

When an angle between the light direction of L2 and that of L3 is referred to as θk, the angle θk is equal to "θ1−α". As shown in FIG. 5, the optical and geometric relationships among the light-directions L1 to L3 allow the refractive angle θx to be represented as "θk+θ2". This provides the equation based on Snell's law:

$$\sin\theta2 = n \cdot \sin(\theta k + \theta 2) \quad (1)$$
$$= n \cdot \sin(\theta 1 + \theta 2 - \alpha)$$

This makes it clear that setting the inclined angle θ2 of the output plane 16b of the light guide member 16 to meet the equation (1) causes the light L3 transmitted through the half mirror plane 16c to be parallel to the optical axis O of the imaging optical system 15. This allows the imaging optical system 15 to focus an image corresponding to the target 12 on the active area of the photodetector 2 based on the transmitted light through the half mirror plane 16c. Accordingly, even if the target 12 is the screen of the LCD, the reading apparatus 10 makes it possible to accurately read the two dimensional code of the target 12.

In addition, in the embodiment, the imaging optical system 15 is composed of the first optical system 18 and the second optical system 19 coaxially arranged between the first optical system 18 and the reading window 11a, providing a telecentric optical system that prevents the field of view V of the first optical system 18 from substantially spreading. This allows the reflected light from the target 12 to be efficiently picked up by the photodetector 14. Even if the target 12 is located away from the reading window 11a of the reading apparatus 10, the reading apparatus 10 allows the number of pixels of the photodetector's active area that allocated to the focused image thereon to increase, making it possible to improve the resolution of the focused image. The second optical system 19 can be composed of a simple lens made of resin molding compounds, reducing the cost of the reading apparatus 10.

Furthermore, all of the outer planes of the light guide member 16 parallel to either the optical axis O2 or the optical axis O3 serve as reflection planes RP that reflect light, which is transmitted inside of the light guide member 16 and is incident to the outer planes RP, toward the inside of the light guide member 16. This prevents the light emitted from the light source 13 and guided inside of the light guide member 16 from being diffused from the outer planes RP of the light guide member 16, making it possible to inhibit light loss on the diffusion of the light. That is, the light guide member 16 can limit its total light loss to the light loss caused by the half mirror plane 16c.

For example, the total light loss of the light guide member 16 is controlled to approximately 50% so that the remaining 50% of the light emitted from the light source 13 can be effectively used for irradiating the target 12. This makes it possible to secure sufficient amount of light required for the irradiation of the target 12 without lacking the amount of light.

As set forth above, the embodiment of the present invention is provide with the light guide member 16 having the entrance plane 16a, the output plane 16b, and the half mirror plane 16c arranged between the imaging optical system 15 and the reading window 11a. In the embodiment, preferably, the inclined angle θ1 of the half mirror 16c with respect to the optical axis O2 and the inclined angle θ2 of the output plane 16b with respect to the surface direction D orthogonal to the optical axis O are set to satisfy the equation (1), and the imaging optical system 15 constitutes a telecentric optical system. Accordingly, even if the target 12 is the screen of the LCD, the embodiment of the present invention makes it possible to read the two dimensional code of the target 12.

In the embodiment, the output plane 16b of the light guide member 16 is inclined at the angle of θ2 with respect to the surface direction D orthogonal to the optical axis O of the imaging optical system 15 so that the refractive angle θx of light refracted by the output plane 16b is increased. The present invention, however, is not limited to the structure.

Figure 6:
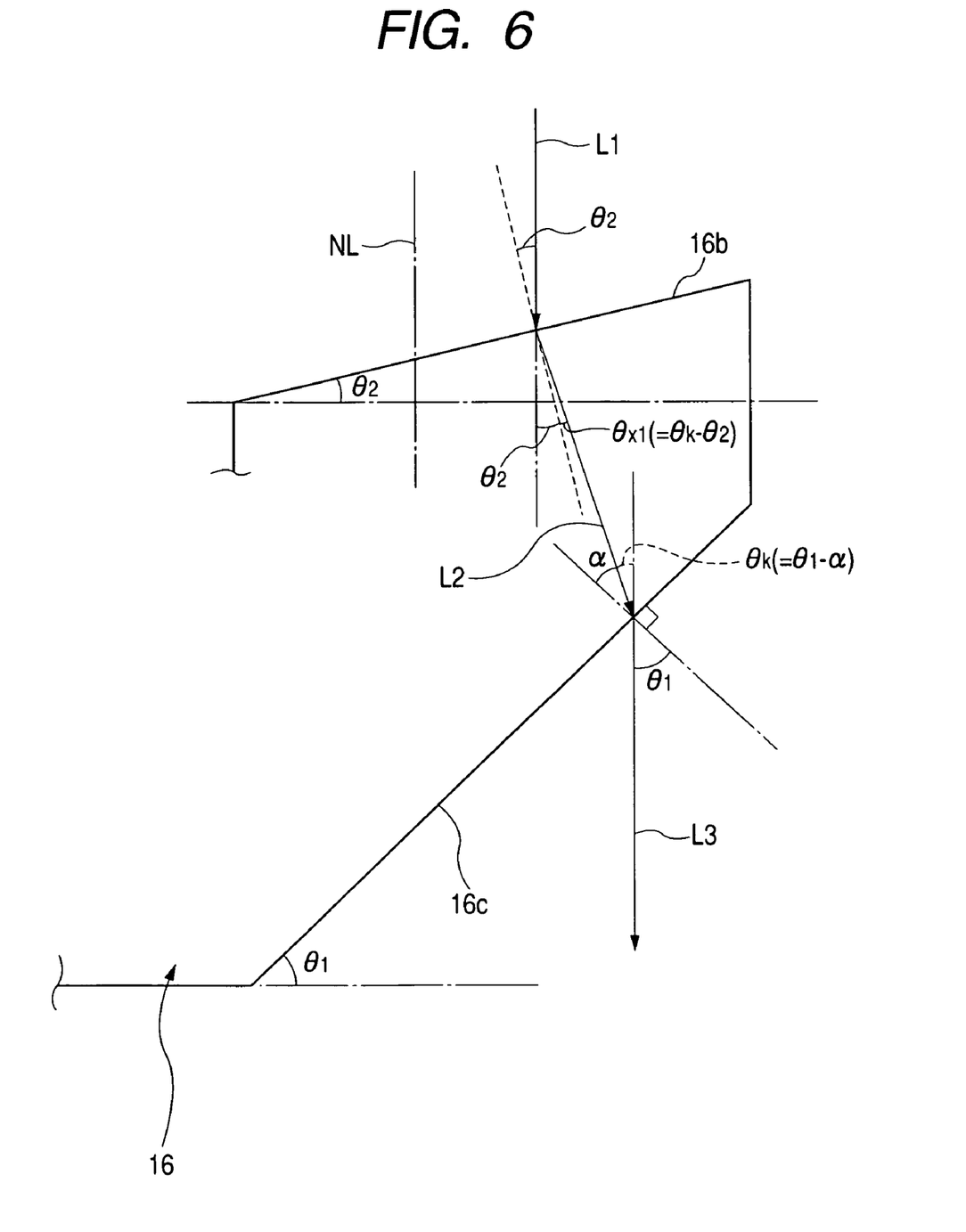
FIG. 6 is a view schematically illustrating the relationship between the inclined angle $\theta 1$ of the half mirror plane of the light guide member and the inclined angle $\theta 2$ of the output plane thereof according to a first modification of the embodiment of the present invention.

In a first modification of the embodiment, as shown in FIG. 6, the output plane 16b of the light guide member 16 is inclined at the angle of θ2 with respect to the surface direction D toward the reading window side so that the refractive angle θx1 of light refracted by the output plane 16b is decreased. In the configuration, the angle θ2 of inclination is set to meet the following equation (4):

$$n \cdot \sin(\theta 1 - \theta 2 - \alpha) = \sin \theta 2 \qquad (4)$$

Figure 7:
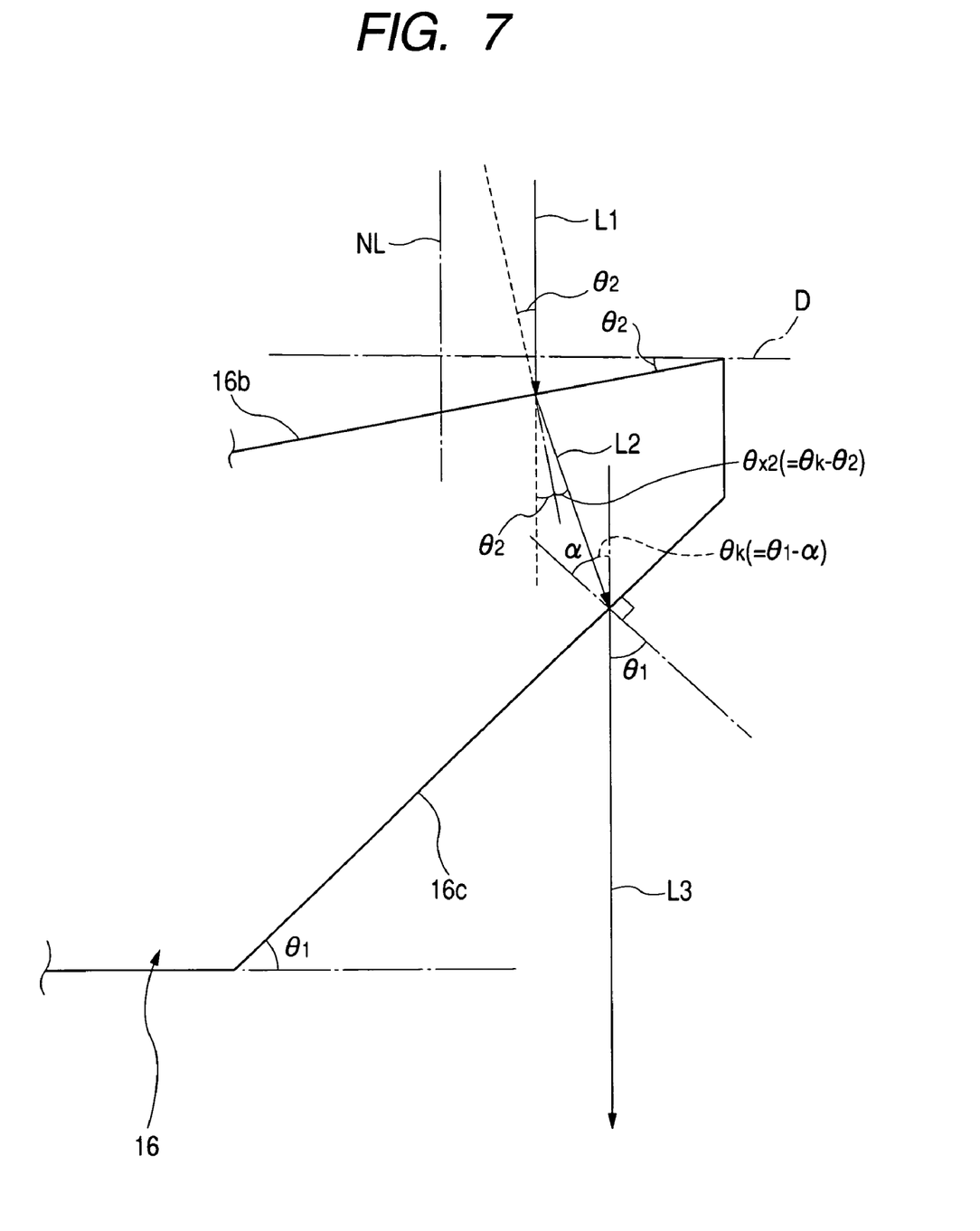
FIG. 7 is a view schematically illustrating the relationship between the inclined angle θ1 of the half mirror plane of the light guide member and the inclined angle θ2 of the output plane thereof according to a second modification of the embodiment of the present invention.

Similarly, in a second modification of the embodiment, as shown in FIG. 7, the output plane 16b of the light guide member 16 is inclined at the angle of θ2 with respect to the surface direction D away from the reading window 11a so that the refractive angle θx2 of light refracted by the output plane 16b is decreased. In the configuration, the angle θ2 of inclination is set to meet the equation (4) represented above.

In the first and second modifications, each of the configurations makes it clear that setting the inclined angle θ2 of the output plane 16b of the light guide member 16 to meet the equation (4) causes the light L3 transmitted through the half mirror plane 16c to be parallel to the optical. axis O of the imaging optical system 15.

In the embodiment, the reading apparatus 10 is applied for optically reading, as the target 12, the screen of an LCD, but the present invention is not limited to the application. The reading apparatus according to the present invention may be applied for optically reading, as a target, an information code directly printed on metal in direct marking. The reading apparatus according to the present invention may be applied for optically reading, as a target, information written on a label or other similar sheet media.

In the embodiment, a coating of aluminum is evaporated over each of the outer planes of the light guide member 16 parallel to either the optical axis O2 or the optical axis O3 to form each of the reflection planes RP, but the present invention is not limited to the structure.

For example, a reflection member, such as a reflection tape, may be attached on each of the outer planes of the light guide member 16 parallel to either the optical axis O2 or the optical axis O3 to form each of the reflection planes RP.

Figure 2:
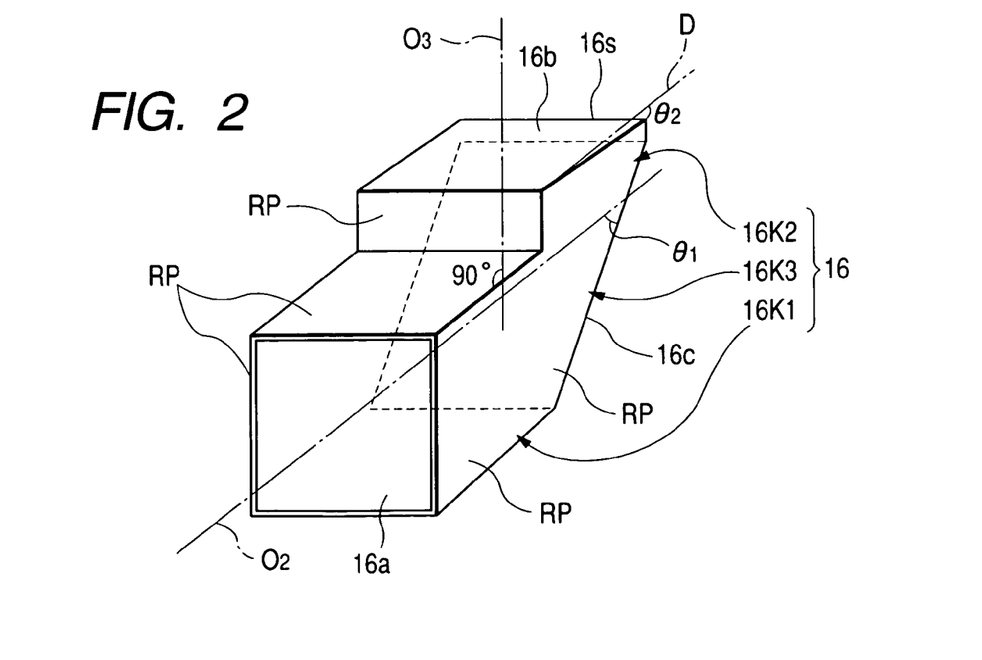
FIG. 2 is a perspective view schematically illustrating a configuration of a light guide member shown in FIG. 1.

In the embodiment, the light guide member 16 has the configuration illustrated in FIGS. 1 and 2, but the present invention is not limited to the configuration. That is, the light guide member according to the present invention may be modified within the scope of the invention. Similarly, the light guide member 16 is made of transparent plastic material, but the present invention is not limited to the material. Namely, the light guide member according to the present invention may be made of another transparent material within the scope of the invention.

In the embodiment, the imaging optical system 15 has the configuration illustrated in FIGS. 1 and 3, but the present invention is not limited to the configuration. That is, the imaging optical system according to the present invention may be modified within the scope of the invention. Similarly, the imaging optical system 15 is made of transparent plastic material, but the present invention is not limited to the material. Namely, the imaging optical system according to the present invention may be made of another transparent material within the scope of the invention.

In addition, the inclined angle θ1 of the half mirror plane 16c is not limited to the angle of 45 degrees. In the embodiment, the present invention is applied to a stationary apparatus for optically reading a target, but the present invention may be applied to a handheld optical information reading apparatus. Moreover, the present invention is not applied only to read the two-dimensional code. The reading apparatus according to the present invention may be applicable for reading a barcode or other optically readable information.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An apparatus for optically reading a target based on light reflected from the target, said apparatus comprising:
   a light source having a first optical axis and configured to emit light;
   an imaging optical system having a second optical axis and arranged so that the reflected light enters into the imaging optical system;
   a photodetector having an active area, said imaging optical system focusing the reflected light on the active area of the photodetector;
   a light guide member arranged between the target and the imaging optical system and disposed on the first and second optical axes, the light guide member being configured to guide the light emitted from the light source to irradiate the guided light to the target while preventing the guided light from leaking out from the light guide member; and
   an output plane arranged on the second optical axis and opposite the target, said output plane being inclined with respect to a direction orthogonal to the second optical axis at angle of θ2 so that a refractive angle of light refracted by the output plane is increased or decreased.

2. An apparatus according to claim 1, wherein said light guide member includes:
   an entrance plane into which the light emitted from the light source enters;
   a half mirror plane arranged opposite the entrance plane and the output plane and disposed on the first and second optical axes; and
   other planes parallel to either the first optical axis or the second optical axis, said half mirror plane being configured to reflect the light entered through the entrance plane toward the output plane so that the light is guided to be directed across the output plane toward the target,
   said light reflected from the target entering from the output plane into the light guide member and being transmitted through the half mirror plane along the second optical axis to enter into the imaging optical system,
   said other planes being configured to reflect the light incident thereto toward an inside of the light guide member when the light entered through the entrance plane into the light guide member is incident to the other planes.

3. An apparatus for optically reading a target based on light reflected from the target, said apparatus comprising:

a light source having a first optical axis and configured to emit light;

an imaging optical system having a second optical axis and arranged so that the reflected light enters into the imaging optical system;

a photodetector having an active area, said imaging optical system focusing the reflected light on the active area of the photodetector; and a light guide member arranged between the target and the imaging optical system and disposed on the first and second optical axes, said light guide member having:

an entrance plane into which the light emitted from the light source enters, an output plane arranged on the second optical axis and opposite the target, a half mirror plane arranged opposite the entrance plane and the output plane and disposed on the first and second optical axes, and other planes parallel to either the first optical axis or the second optical axis, said half mirror plane being configured to reflect the light entered through the entrance plane into the light guide member toward the output plane, said light reflected from the target entering from the output plane into the light guide member and being transmitted through the half mirror plane along the second optical axis to enter into the imaging optical system, said other planes being configured to reflect the light incident thereto toward an inside of the light guide member when the light entered through the entrance plane into the light guide member is incident to the other planes, said half mirror plane being inclined with respect to the first optical axis at an angle of θ1, said output plane being inclined with respect to a direction orthogonal to the second optical axis at an angle of θ2 so that a refractive angle of light refracted by the output plane is increased, wherein, when a refractive index of the light guide member is represented as n, said inclined angle θ2 is set to meet the following equation:

$n \cdot \sin(\theta 1 + \theta 2 - \alpha) = \sin \theta 2$ where α is represented by the following equation:

$$\alpha = \sin^{-1}\left(\frac{\sin \theta 1}{n}\right)$$

4. An apparatus according to claim 3, wherein said first optical axis and second optical axis are orthogonal to each other, said inclined angle θ1 of the half mirror plane is set to 45 degrees or thereabout.

5. An apparatus according to claim 4, wherein said light guide member includes:

a first light guide portion having the entrance plane and a third optical axis, the first light guide portion being arranged so that the third optical axis is parallel or coaxial to the first optical axis;

a second light guide portion having the output plane and a fourth optical axis, the second guide portion being arranged so that the fourth optical axis is coaxial to the second optical axis; and a coupling portion having the half mirror plane and coupling the first and second light guide portions.

6. An apparatus according to claim 3, wherein said imaging optical system comprises:

a first imaging optical system arranged coaxially with respect to the photodetector to be close thereto; and a second imaging optical system arranged between the first imaging optical system and the light guide member, said first imaging optical system focusing the light entered into the imaging optical system on the active area of the photodetector, said second imaging optical system being coaxially aligned to the first imaging optical system and configured to prevent a field of view of the first imaging optical system from spreading.

7. An apparatus according to claim 3, wherein aluminum is evaporated onto the other planes of the light guide member.

8. An apparatus for optically reading a target based on light reflected from the target, said apparatus comprising:

a light source having a first optical axis and configured to emit light;

an imaging optical system having a second optical axis and arranged so that the reflected light enters into the imaging optical system;

a photodetector having an active area, said imaging optical system focusing the reflected light on the active area of the photodetector, and a light guide member arranged between the target and the imaging optical system and disposed on the first and second optical axes, said light guide member having:

an entrance plane into which the light emitted from the light source enters, an output plane arranged on the second optical axis and opposite the target, a half mirror plane arranged opposite the entrance plane and the output plane and disposed on the first and second optical axes, and other planes parallel to either the first optical axis or the second optical axis, said half mirror plane being configured to reflect the light entered through the entrance plane toward the output plane so that the light is guided to be directed across the output plane toward the target, said light reflected from the target entering from the output plane and being transmitted through the half mirror plane along the second optical axis to enter into the imaging optical system, said other planes being configured to reflect the light incident thereto toward an inside of the light guide member when the light entered through the entrance plane into the light guide member is incident to the other planes, said half mirror plane being inclined with respect to the first optical axis at an angle of θ1, said output plane being inclined with respect to a direction orthogonal to the second optical axis at an angle of θ2 so that a refractive angle of light refracted by the output plane is decreased, wherein, when a refractive index of the light guide member is represented as n, said inclined angle θ2 is set to meet the following equation:

$n \cdot \sin(\theta 1 - \theta 2 - \alpha) = \sin \theta 2$ where α is represented by the following equation:

$$\alpha = \sin^{-1}\left(\frac{\sin \theta 1}{n}\right)$$

9. An apparatus according to claim 8, wherein said first optical axis and second optical axis are orthogonal to each other, said inclined angle θ1 of the half mirror plane is set to 45 degrees or thereabout.

10. An apparatus according to claim 9, wherein said light guide member includes:
- a first light guide portion having the entrance plane and a third optical axis, the first light guide portion being arranged so that the third optical axis is parallel or coaxial to the first optical axis;
- a second light guide portion having the output plane and a fourth optical axis, the second guide portion being arranged so that the fourth optical axis is coaxial to the second optical axis; and
- a coupling portion having the half mirror plane and coupling the first and second light guide portions.

11. An apparatus according to claim 8, wherein said imaging optical system comprises a first imaging optical system arranged coaxially with respect to the photodetector to be close thereto and a second imaging optical system arranged between the first imaging optical system and the light guide member, said first imaging optical system focusing the light entered into the imaging optical system on the active area of the photodetector, said second imaging optical system being coaxially aligned to the first imaging optical system and configured to prevent a field of view of the first imaging optical system from spreading.

12. An apparatus according to claim 8, wherein aluminum is evaporated onto the other planes of the light guide member.

* * * * *